United States Patent [19]
Ishii et al.

[11] Patent Number: 5,967,528
[45] Date of Patent: Oct. 19, 1999

[54] WORKPIECE CHUCKING DEVICE

[75] Inventors: Masato Ishii, 10482, Takayama-cho, Ikoma-shi, Nara-ken; Yoshiyuki Ohta, Ikoma, both of Japan

[73] Assignee: Masato Ishii, Nara-ken, Japan

[21] Appl. No.: 08/848,835

[22] Filed: May 5, 1997

[30] Foreign Application Priority Data

Jun. 18, 1996 [JP] Japan ................................ 8-178527

[51] Int. Cl.$^6$ ............................ B23B 31/10; B23B 31/06
[52] U.S. Cl. ........................................ 279/4.05; 279/2.05
[58] Field of Search ...................... 279/4.05, 2.05

[56] References Cited

U.S. PATENT DOCUMENTS 5,259,630 11/1993 Ishii et al. ............................ 279/4.05

FOREIGN PATENT DOCUMENTS 360186307 9/1985 Japan ................................ 279/4.05

*Primary Examiner*—Steven C. Bishop
*Assistant Examiner*—Mark T. Henderson

*Attorney, Agent, or Firm*—Wenderoth, Lind & Ponack, L.L.P.

[57] ABSTRACT

A workpiece chucking device is strengthened in its workpiece chucking force. The workpiece chucking device comprises a diaphragm 14 having chucking claws 35 in the front of a base 12 which will rotate along with a spindle 11 of a machine tool, a piston which will be moved back and forth by switching fluid fed into a hollow chamber 15 of the base, a cylindrical member 21 inserted in a center of the piston and held to the base, first balls 24 fitted into even-numbered ones of a plurality of transmitting holes formed in the cylindrical member, as well as second balls fitted into odd-numbered ones of the transmitting holes, and a recessed fitting portion 29 provided in an outer circumferential surface of a slider 26 which is inserted into the cylindrical member and connected to the diaphragm so that parts of circumferential surfaces of the first and second balls will be fitted into the recessed fitting portion 29. The slider will retreat only when the first balls are pushed into the recessed fitting portion by a first tapered portion of the piston, while the slider will be advanced when only the second balls are pushed into the recessed fitting portion by a second tapered portion of the piston.

1 Claim, 6 Drawing Sheets

WORKPIECE CHUCKING DEVICE

BACKGROUND OF THE INVENTION

The present invention relates to a device for chucking a workpiece to be machined.

Conventionally, for chucking a workpiece to be machined, as shown in Japanese Patent Laid-Open Publication No. HEI 5-104312, first, fluid is fed under pressure to behind a piston in a hollow chamber through a passage so that the piston is slid. With this sliding of the piston, a central portion of a diaphragm is pushed forward, by which chucking claws are opened wide.

Next, a workpiece is inserted inside the wide-open chucking claws, and then the fluid is stopped from being fed.

Then, the piston is returned by restoring force of the diaphragm, so that the chucking claws are contracted. Thus, the work is chucked.

Further, the fluid is fed under pressure to the front side of the piston in the hollow chamber through the passage, so that the piston is slid backward, while the central portion of the diaphragm is pulled backward. In this way, the chucking claws are contracted toward the center.

By doing so, a greater chucking force can be obtained.

With such a chucking device, which is so arranged that the piston and the diaphragm connected to the piston are pulled up together by fluid pressure that acts on the pressure-receiving surface, there has been a disadvantage that a great clamping force could not be obtained.

Accordingly, as shown in FIG. 8, there has been provided a chucking device in which a first piston 3 and a second piston 4 connected to a diaphragm 2 are built in a hollow chamber 1, and fluid is fed under pressure to the front side of the first piston 3 and the second piston 4 in the hollow chamber 1 through a passage 5, so that greater power is obtained (double piston system).

In addition, more than two pistons may be arrayed so that even greater power can be obtained.

In this case, a considerably large weight increase is involved due to the double piston system such that the device would be unsuitable for high-speed revolution, and the size is also increased, thereby posing disadvantages.

SUMMARY OF THE INVENTION

Therefore, an object of the present invention is to provide a workpiece chucking device which allows a remarkable power increase to be attained without causing considerable increase in weight or size, i.e., with one piston.

In order to achieve the above object, the present invention adopts a workpiece chucking device comprising: a base which will rotate along with a spindle of a machine tool and which has a diaphragm whose outer peripheral edge is fixed to a peripheral edge of a front face of the base; a piston which is built in a hollow chamber provided within the base and which will be moved back and forth by switching fluid fed through a passage; a cylindrical member inserted in a center of the piston so as not to cause any fluid leaks and held to the base; a plurality of transmitting holes provided on a circumference of the cylindrical member; a first group of balls fitted into even-numbered ones of the transmitting holes, as well as a second group of balls fitted into odd-numbered ones of the transmitting holes; a slider connected to the diaphragm and slidably fitted and inserted into the cylindrical member; a recessed fitting portion provided in an outer circumferential surface of the slider so that parts of circumferential surfaces of the first balls and the second balls are fitted into the recessed fitting portion; a first tapered portion which is provided in a wall surface of the through hole of the cylindrical member in the piston so as to push the first balls therein toward the center along with advance of the piston so that the slider is cause to retreat and an escape which is provided so as to let the second balls escape outward, as well as a second tapered portion which is provided in the wall surface of the through hole so as to push the second balls therein toward the center along with retreat of the piston so that the slider is advanced and an escape which is provided so as to let the first balls escape outward; and a plurality of chucking claws provided in a proper array in a front face of the diaphragm.

BRIEF DESCRIPTION OF THE DRAWINGS

FIGS. 5A and 5B are is an operational views in which first balls have been pushed in;

FIGS. 6A and 6B are is an operational views in which second balls have been pushed in;

DETAILED DESCRIPTION OF THE PREFERRED EMBODIMENTS

Figure 1:
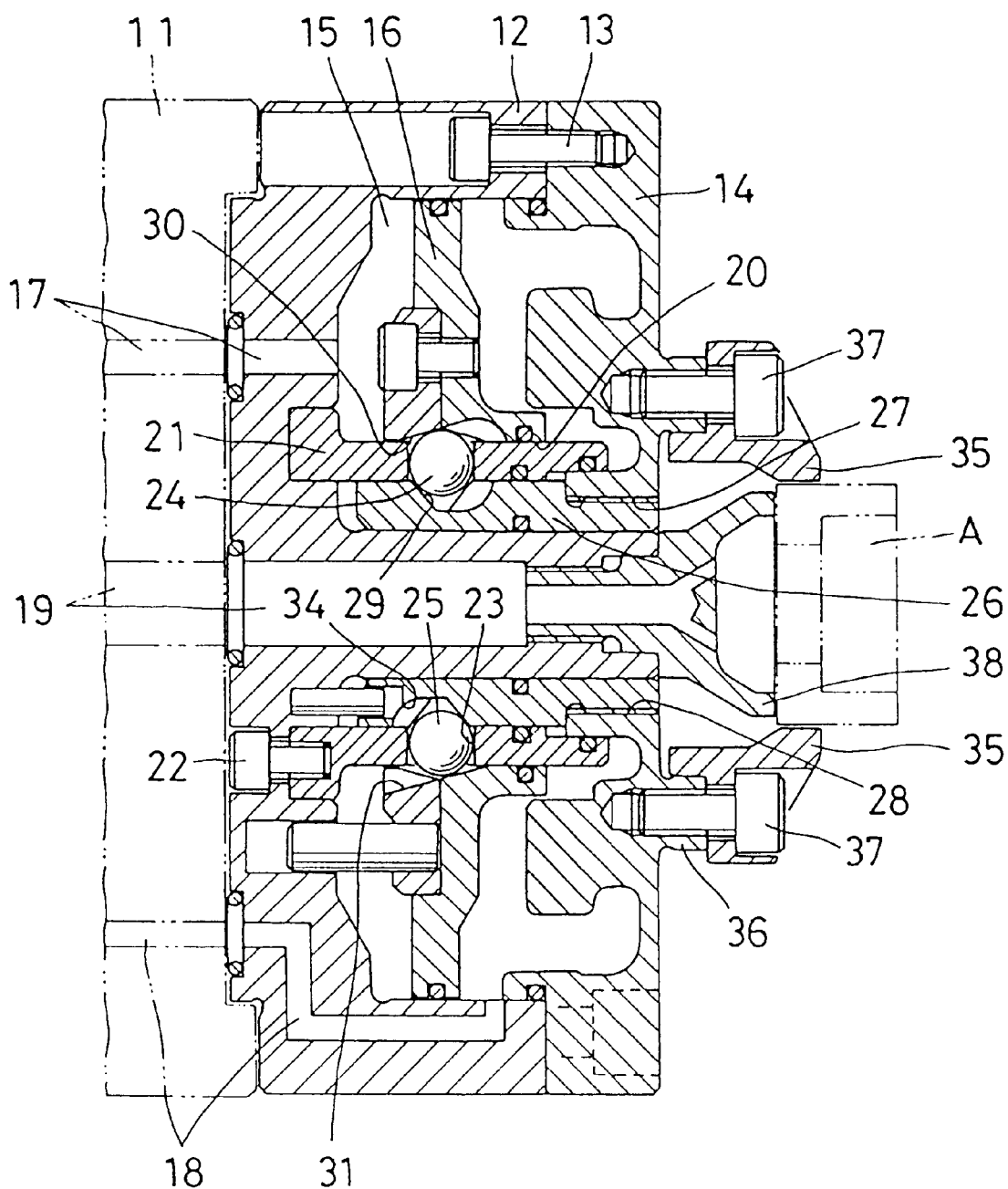
FIG. 1 is a side view in vertical cross section of a workpiece chucking device according to the present invention.
Figure 2:
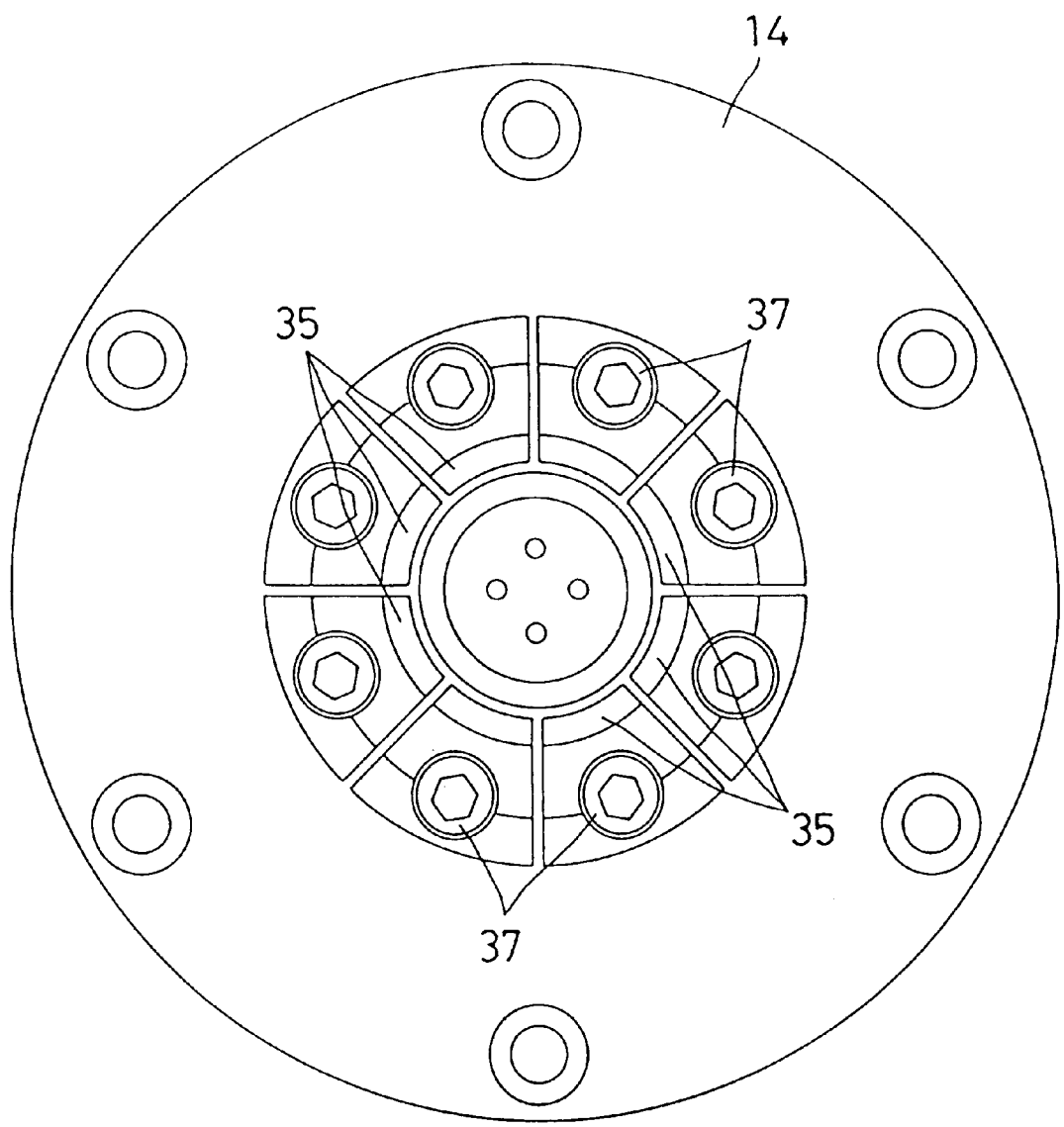
FIG. 2 is a front view.
Figure 3:
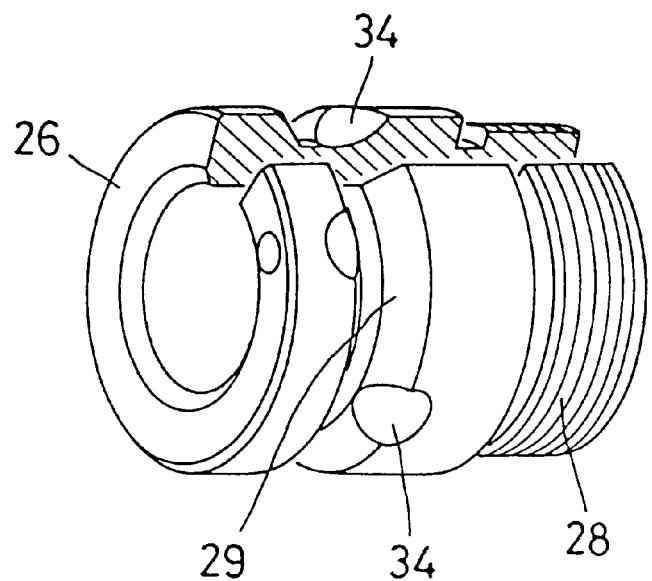
FIG. 3 is a perspective view of a slider.
Figure 4:
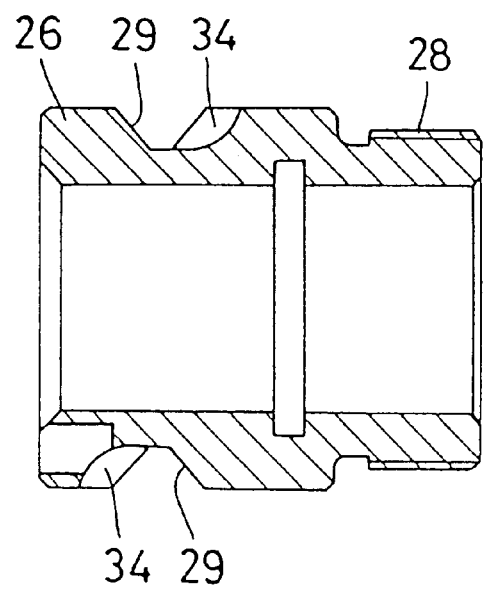
FIG. 4 is a side view in vertical cross section of the slider.

Hereinbelow, an embodiment of the present invention is described with reference to the accompanying drawings.

In this embodiment of the invention, as shown in FIGS. 1 to 4, on the front of a base 12 that will rotate with a spindle 11 of a machine tool, is provided with a diaphragm 14 whose outer periphery is fixed to the periphery of the base 12 via a fixing bolt 13.

The diaphragm 14 used here is implemented by a diaphragm having a proper hardness and a large cut-out tensile strength and fabricated by machining a material of, for example, a precipitation-hardened alloy in its solid-solubilizing process state, followed by heating time and curing with time.

Also, a hollow chamber 15 is defined in the base 12. In this hollow chamber 15 is provided a piston 16 that will be moved back and forth by switching the fluid that is fed through the passages.

As the passage for feeding the fluid (air), in the illustrated embodiment, a first passage 17 communicating with the rear side of the piston 16 in the hollow chamber 15 and a second passage 18 communicating with the front side of the piston 16 in the hollow chamber 15 are provided in the spindle 11 that rotates along with the base 12. Otherwise, there are some cases where the passage is implemented by employing, for example, an air tube in a coolant-liquid feed passage 19 located at the axis of the spindle 11.

Further, a through hole 20 is provided in the center of the piston 16, and a cylindrical member 21 held to the base 12 is inserted into the through hole 20.

As a means for holding the cylindrical member 21 to the base 12, one end of the cylindrical member 21 is secured via a bolt 22 in the illustrated embodiment.

A plurality of transmitting holes 23 are provided on the circumference of the cylindrical member 21, and first balls 24 are fitted into even-numbered transmitting holes 23, respectively, while second balls 25 are fitted into odd-numbered transmitting holes 23, respectively.

Further, a slider 26 connected to the diaphragm 14 is slidably inserted into the cylindrical member 21.

As the means for connecting the diaphragm 14 and the slider 26 with each other, a threaded hole 27 provided in the diaphragm 14 and a threaded shaft 28 provided at one end of the slider 26 are screwed in for the connection, in this illustrated embodiment.

In addition, as shown in FIG. 1, a means for eliminating leaks of the fluid (with the aid of an O-ring) is provided over the place where the cylindrical member 21 extends through the piston 16 and the place where the slider 26 extends through the cylindrical member 21.

On the outer circumferential surface of the slider 26 is provided a recessed fitting portion 29 for fitting thereinto parts of the circumferential surfaces of the first balls 24 and the second balls 25.

Further, on the inner wall surface of the through hole 20 are provided a first tapered portion 30 for pushing the first balls 24 toward the center (inward) along with the advance of the piston 16 to cause retreat of the slider 26, and an escape 31 for letting the second balls 25 escape outward, as well as a second tapered portion 32 for pushing the second balls 25 toward the center (inward) along with the retreat of the piston 16 to advance the slider 26, and an escape 33 for letting the first balls 24 escape outward.

In addition, the recessed fitting portion 29 has a recessed area 34 provided contiguous to the recessed fitting portion 29 for avoiding collisions so that when either the first balls 24 or the second balls 25 are pushed inward in the recessed portion 29, the slider 26 will not be hindered from sliding.

Also, chucking claws 35 for a workpiece A which are arrayed as appropriate are provided in the front of the diaphragm 14.

In the illustrated embodiment, a large number of the chucking claws 35 are arranged radially. A threaded cylinder 36 is integrally provided in the front of the diaphragm 14, as shown in FIG. 1, and the chucking claws 35 are installed by screwing a bolt 37 into this threaded cylinder 36.

It is noted that the chucking claws 35 are classified into inner chucks and outer chucks.

Designated by reference numeral 38 in FIG. 1 is a positioning stopper for the workpiece A. This stopper 38 also serves as a nozzle. Numeral 39 denotes a guide cylinder for the slider 26.

Figure 6A:
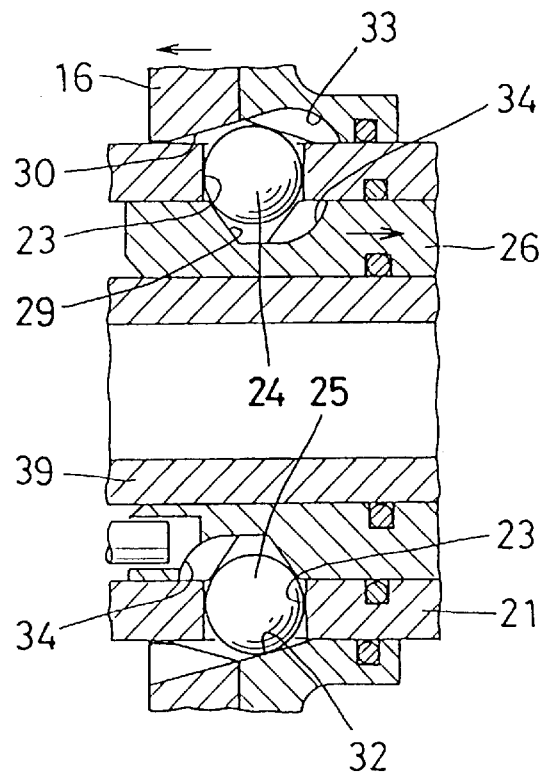
Figure 6B:
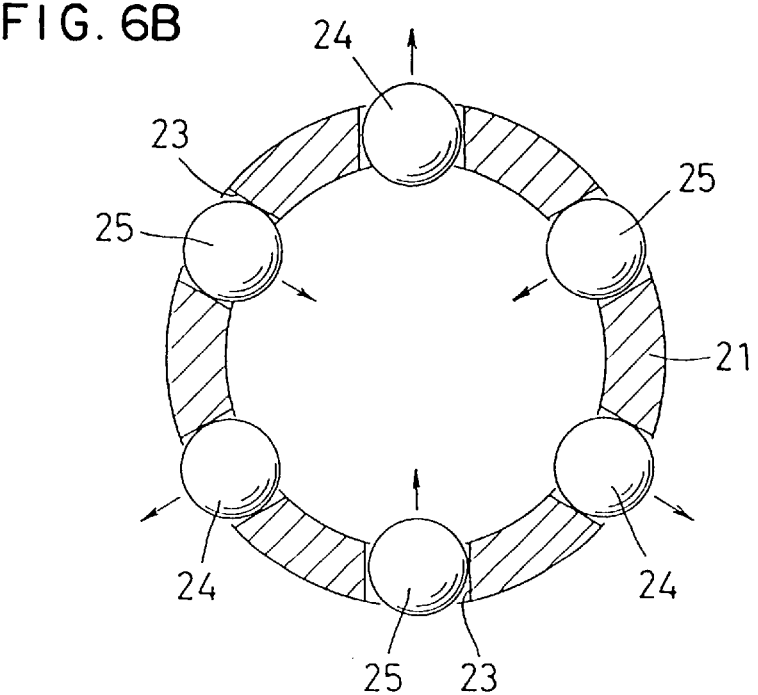

With the above arrangement, first, the fluid is fed under pressure to the front side of the piston 16 in the hollow chamber 15 through the second passage 18, so that the piston 16 is slid leftward in FIG. 6A. Then, as the piston 16 is slid, the second balls 25 are pushed toward the center (inward) by the second tapered portion 32 (as shown in FIGS. 6A and 6B).

Meanwhile, as the slider 26 is slid, the first balls 24 are made to escape outward by the recessed fitting portion 29 of the slider 26 as shown in FIG. 6 (II).

Then, the slider 26 having the recessed fitting portion 29 that makes contact with the second balls 25 pushed inward is slid in a direction opposite to the direction in which the piston 16 is slid. As a result, the diaphragm 14 is pushed out at its center by the slider 26, by which the chucking claws 35 are opened wide.

In this state, the workpiece A is fitted to the inside of the open chucking claws 35, and thereafter the fluid is stopped from being fed through the second passage 18.

As a result, the slider 26 is pushed back by the restoring force of the diaphragm 14, while the contracted chucking claws 35 are pressed against the outer circumferential surface of the workpiece A. Thus, the workpiece A is chucked.

Figure 5A:
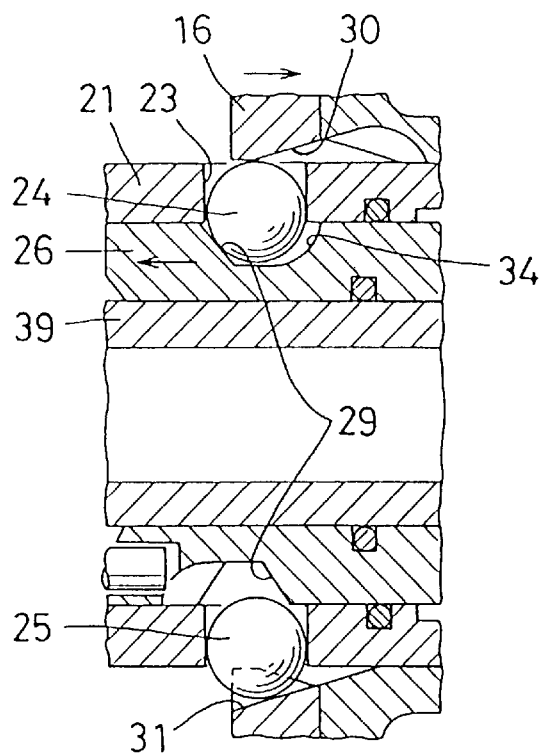
Figure 5B:
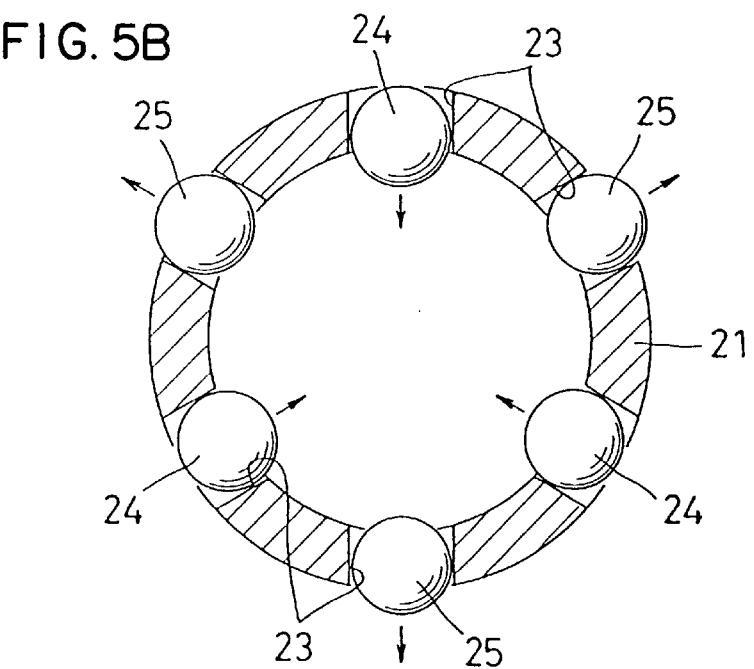

In order to enhance the chucking force, the fluid is fed under pressure to the rear side of the piston 16 in the hollow chamber 15 through the first passage 17, so that the piston 16 is slid rightward in FIGS. 5A and 5B. Then, as the piston 16 is slid, the first balls 24 are pushed toward the center (inward) by the first tapered portion 30 as shown in FIG. 5 (II).

Meanwhile, as the slider 26 is slid, the second balls 25 are made to escape outward by the recessed fitting portion 29 for the slider 26, as shown in FIG. 5A and 5B.

Then, the slider 26 having the recessed fitting portion 29 that makes contact with the first balls 24 pushed inward is slid in a direction opposite to the direction in which the piston 16 is slid. As a result, the central portion of the diaphragm 14 is pulled back by the slider 26, by which a force to contract the chucking claws 35 is generated.

Thus, the chucking force for the workpiece A is enhanced.

Figure 7:
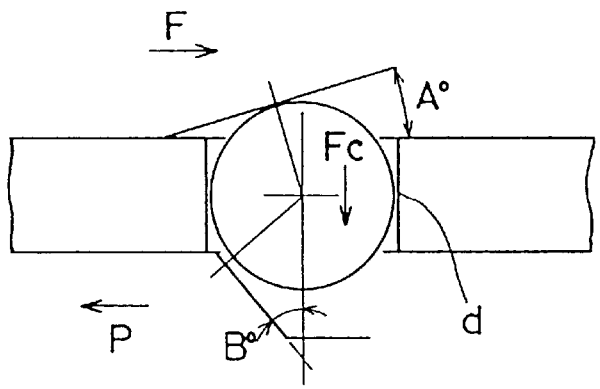
FIG. 7 is an view for explaining equations.
Figure 8:
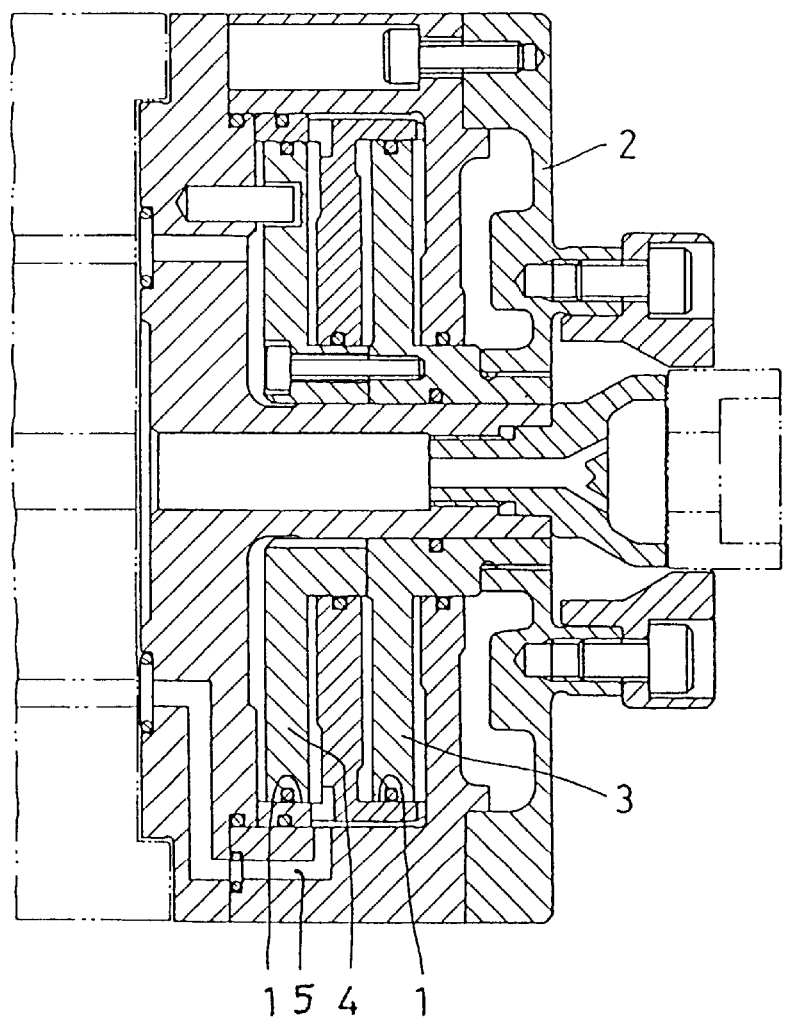
FIG. 8 is a side view in vertical cross section of a prior art counterpart.

Here is an explanation of equations with reference to FIG. 7.

$$FC = F \times \frac{1}{\tan(A + e)} \qquad \text{Equation (1)}$$

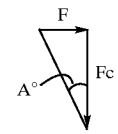

where $e$=friction angle=$\tan^{-1}$(friction coefficient $\mu$)

$$P = Fc' \times \frac{1}{\tan(B + e)} \qquad \text{Equation (2)}$$

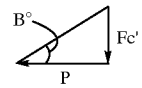

where Fc'=Fc−[friction at d], [friction at d]=(F+P)×$\mu$

<Example of Calculation>

If A=10°, B=40°, $\mu$=0.03 and e=1.72°, then $$P = F \times \frac{1}{\tan(10 + 1.72)} \times \frac{1}{\tan(40 + 1.72)}$$
$$= F \times \frac{1}{0.207} \times \frac{1}{0.892}$$
$$P = 5.41 \times F$$

As described above, with the workpiece chucking device according to the present invention, the first balls are pushed in by the first tapered portion so that the slider is caused to retreat, while the central portion of the diaphragm is pulled back. As a result, the chucking force with which the workpiece is chucked becomes remarkably stronger.

Consequently, the workpiece chucking device is enabled to implement high-speed revolution machining. Moreover, the workpiece chucking device becomes able to exert a strong chucking force while remaining small in size.

What is claimed is:

1. A workpiece chucking device comprising: a base which will rotate along with a spindle of a machine tool and which has a diaphragm whose outer peripheral edge is fixed to a peripheral edge of a front face of the base; a piston disposed in a hollow chamber provided within the base and which will be moved in advancing and retreating directions by switching fluid fed through a passage, said piston having a through hole; a cylindrical member inserted in the through hole of the piston so as to prevent fluid leaks and held to the base; a plurality of transmitting holes provided on a circumference of the cylindrical member; a first group of balls fitted into even-numbered ones of the transmitting holes, as well as a second group of balls fitted into odd-numbered ones of the transmitting holes; a slider connected to the diaphragm and slidably fitted in the cylindrical member; a recessed fitting portion provided in an outer circumferential surface of the slider so that parts of circumferential surfaces of the first balls and the second balls are fitted in the recessed fitting portion; a first tapered portion provided in a wall surface of the through hole of the piston so as to push the first balls inwardly along with movement of the piston in the advancing direction so that the slider is caused to move in the retreating direction, and an escape which is provided so as to let the second balls escape outward; a second tapered portion provided in the wall surface of the through hole of the piston so as to push the second balls inwardly along with movement of the piston in the retreating direction so that the slider is moved in the advancing direction, and an escape which is provided so as to let the first balls escape outward; and a plurality of chucking claws provided in an array at a front face of the diaphragm.

* * * * *